United States Patent [19]

Borgstrom

[11] 4,202,591
[45] May 13, 1980

[54] APPARATUS FOR THE REMOTE GROUNDING, CONNECTION AND DISCONNECTION OF HIGH VOLTAGE ELECTRICAL CIRCUITS

[75] Inventor: Alan D. Borgstrom, Hackettstown, N.J.

[73] Assignee: Amerace Corporation, New York, N.Y.

[21] Appl. No.: 949,544

[22] Filed: Oct. 10, 1978

[51] Int. Cl.² .......................................... H01R 13/52
[52] U.S. Cl. ............................... 339/111; 200/144 C; 339/143 R
[58] Field of Search ................. 339/111, 59, 60 C, 75, 339/92 R, 143 R; 200/144 C, 151

[56] References Cited

U.S. PATENT DOCUMENTS

| | | | |
|---|---|---|---|
| 3,883,208 | 5/1975 | Sankey et al. | 339/111 X |
| 3,930,709 | 1/1976 | Stranger et al. | 339/111 |

*Primary Examiner*—Roy Lake
*Assistant Examiner*—DeWalden W. Jones
*Attorney, Agent, or Firm*—Richard A. Craig; Arthur Jacob

[57] ABSTRACT

A high voltage electrical connector of the type employed to connect a high voltage cable to the terminal of an electrical apparatus, such as a transformer, in a power distribution circuit is provided with a connector element which enables a ground connection to be made so as to ground the terminal without disconnecting the connector. A fault-closing device is provided in the electrical connector, in the event that the ground connection inadvertently is made when the circuit is energized. Access is provided through the connector element and the fault-closing device for a tool which can be inserted and operated from a remote location to selectively disconnect and connect the electrical connector and the terminal of the electrical apparatus, while the electrical connector and the cable attached thereto are grounded.

17 Claims, 5 Drawing Figures

APPARATUS FOR THE REMOTE GROUNDING, CONNECTION AND DISCONNECTION OF HIGH VOLTAGE ELECTRICAL CIRCUITS

The present invention relates generally to apparatus for assisting in the grounding of circuit elements in high voltage power distribution circuits and in the connection and disconnection of high voltage electrical connectors to and from terminals of high voltage electrical apparatus in such circuits, and pertains, more specifically, to apparatus which enables the grounding of the circuits served by such connectors, even when the circuits are energized, from a remote location to promote the safety of workmen who maintain such installations and make the connections and disconnections.

The increasingly widespread use of underground power distribution systems has led to the development of larger systems utilizing components designed to handle greater amounts of power. Electrical connectors developed for use in such systems have been designed to accommodate approximately 15 to 35 kV. Along with the development of such components there has arisen the need for apparatus which will enable installation and maintenance of the various components of the system with safety. Thus, it has become common practice to manipulate such components, as, for example, in the connection and disconnection of electrical connectors to and from the terminals of high voltage electrical apparatus, from a remote location which places the workman at a safe distance from the connection. An insulated tool, known as a "hot-stick," has come into almost universal use by workmen who install and service high voltage power distribution systems for manipulating the various components in making connections and disconnections in the systems.

It is the practice, during the installation and service of a high voltage power distribution circuit, that the circuit is de-energized and the cables of the circuit are grounded. Apparatus has been developed for establishing a visible ground connection to circuit elements of a de-energized high voltage power distribution circuit, through the use of a hot-stick, at an electrical connector for purposes of servicing the circuit with safety. However, experience has shown that the circuit to be serviced is not always de-energized, because of possible equipment failure or operator error, and a successful ground connection cannot be effected with safety.

It is an object of the present invention to provide apparatus for enabling the establishment of a visible ground connection to circuit elements of a high voltage power distribution circuit, even though the circuit may be energized, for purposes of servicing the circuit with safety.

Another object of the invention is to provide apparatus for establishing such a visible ground connection through the use of a hot-stick, at an electrical connector.

Still another object of the invention is to provide apparatus which enables a hot-stick to be employed in providing a ground connection to the terminal contact of a high voltage electrical connector under fault conditions and for the effective connection and disconnection of the electrical connector to and from the terminal of an electrical apparatus.

A further object of the invention is to provide apparatus which combines the dual functions of grounding the terminal contact of a high voltage electrical connector and being operable to connect and disconnect the connector from the terminal of a high voltage electrical apparatus.

A still further object of the invention is to provide simplified apparatus for attachment to a hot-stick to enable increased ease and reduced time in the manipulation of high voltage electrical connectors and components thereof from a remote location.

The above objects, as well as still further objects and advantages, are attained by the present invention which may be described briefly as apparatus for enabling operation of a high voltage electrical connector from a remote location by the use of an insulated tool, such as a hot-stick, to effect selective grounding, and selective connection and disconnection of the connector and a terminal of an electrical apparatus, the connector having a terminal contact affixed to the conductor of a high voltage cable for electrically connecting the conductor to the terminal, the apparatus comprising: a generally tubular housing extending axially between opposite ends; means for joining the housing to the terminal contact; a female contact element carried by the housing adjacent one of the opposite ends thereof and including an axial opening therein for receiving a complementary male contact element; a threaded fastener carried by the housing adjacent the other of the opposite ends for securing the terminal contact to the terminal of the electrical apparatus, the threaded fastener having a wrenching configuration aligned with the axial opening in the female contact element; and a fault-closing means carried by the housing for enabling the closing of a ground connection to the female contact element under a fault-closing condition, the fault-closing means having an aperture passing axially therethrough and aligned with the opening in the female contact element and with the wrenching configuration of the threaded fastener to establish an open passage to the wrenching configuration through the female contact element and the fault-closing device. The invention further contemplates a tool including a sleeve of conductive material receivable within the opening of the female contact element for making an electrical connection therewith; a rod extending axially through the sleeve and having opposite ends, the rod being movable rotationally and axially relative to the sleeve; a further wrenching configuration on the rod at one of the opposite ends, the further wrenching configuration being complementary to the wrenching configuration of the threaded fastener for engagement therewith; and coupling means on the rod at the other of the opposite ends for selectively coupling the rod to the insulated tool, whereby axial movement of the rod will pass the rod axially through the open passage and engage the complementary wrenching configurations, and rotation of the rod will selectively engage and disengage the threaded fastener and the terminal of the electrical apparatus.

The invention will be understood more fully, while still further objects and advantages will become apparent, in the following detailed description of a preferred embodiment illustrated in the accompanying drawing, in which.

Figures 1, 2:
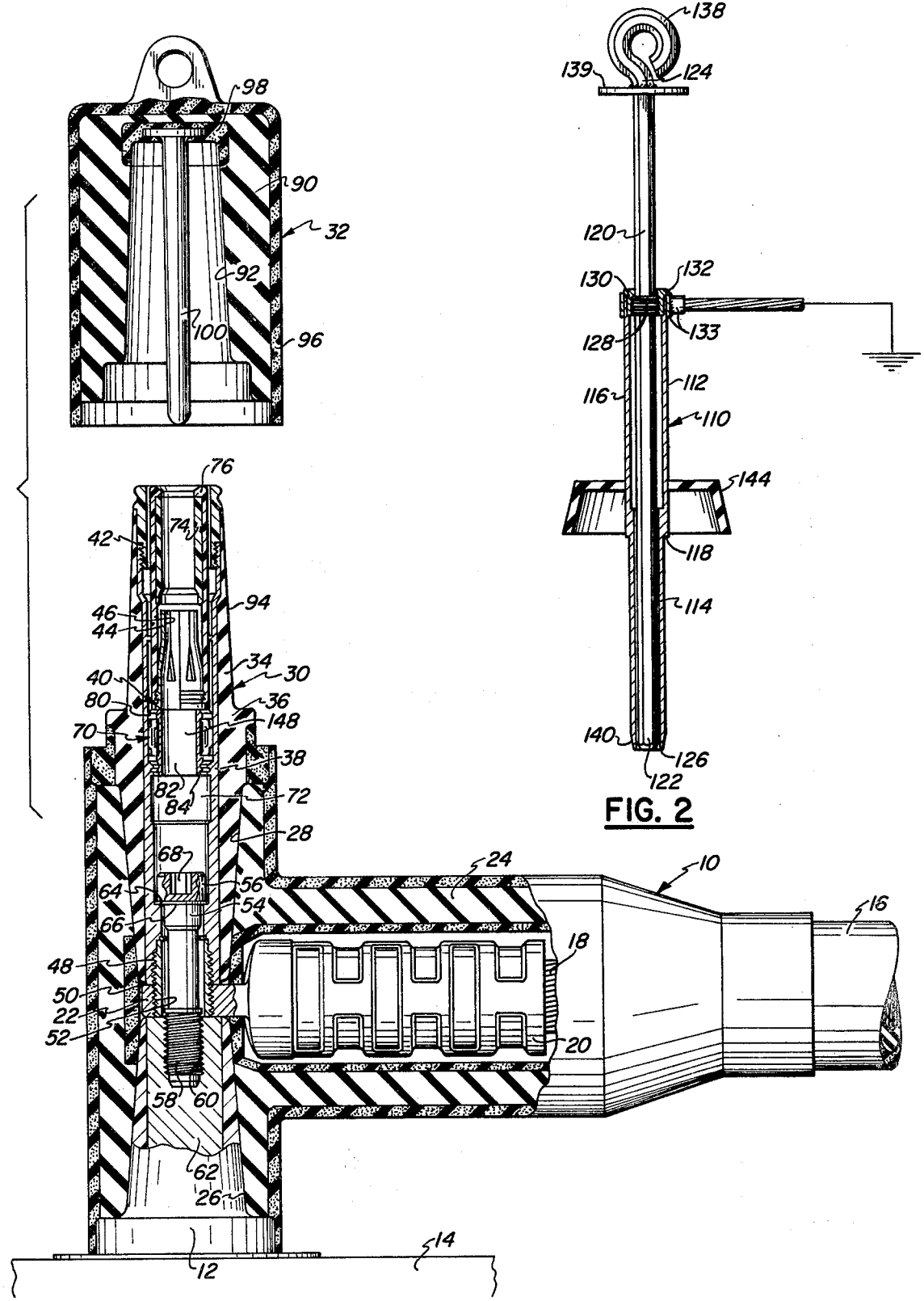
FIG. 1 is an exploded elevational view, mostly broken away, of a junction in a high voltage power distribution system wherein an electrical connector constructed in accordance with the invention is connected to the terminal of an electrical apparatus and is about to be grounded and disconnected with a tool constructed in accordance with the invention.
FIG. 2 is an elevational cross-sectional view of the tool.

Referring now to the drawing, and especially to FIG. 1 thereof, an electrical connector in the form of a T-shaped receptacle 10 is shown connected to the terminal 12 of an electrical apparatus, which in this instance is a high voltage power distribution transformer 14. The receptacle 10 is affixed to the terminus of a high voltage cable 16 having a central conductor 18 to which there is attached, as by crimping, an electrical terminal contact 20 having an integral lug 22, which, in turn, is electrically connected to the terminal to complete a distribution circuit through cable 16.

A composite body 24 surrounds the contact 20 and provides an axially extending receptacle recess 26 within which the terminal 12 is received. A second axially extending recess 28, opposite to first recess 26, receives an interface bushing assembly 30 which is constructed to enable direct connection between the terminal 12 and a commonly available electrical connector, such as an elbow receptacle (not shown). Under normal operating conditions, cap 32 is fitted onto the bushing assembly 30.

Bushing assembly 30 includes a generally tubular housing 34 having a member 36 of dielectric material, such as an insulating elastomer, and a central tubular member 38 of conductive material, such as copper or aluminum. A female contact assembly 40 is located adjacent the upper end 42 of tubular member 38 and includes a female contact element 44 having a central opening 46 for receiving a complementary male contact element (not shown). A threaded sleeve 48 at the lower end 50 of tubular member 38 is threaded into the tubular member 38 and into a threaded aperture 52 in lug 22 to secure the bushing assembly 30 to the terminal contact 20.

A threaded fastener in the form of bolt 54 has a bolt head 56 at one end thereof and a threaded shaft 58 projecting downwardly beyond the tubular member 38 to extend axially through the lug 22 and into a threaded hole 60 in the conductor 62 of the terminal 12. The bolt head 56 is drawn toward a shoulder 64 in tubular member 38, through an interposed spring washer 66, to secure the bushing assembly 30 and lug 22 to conductor 62 of terminal 12. A wrenching configuration is provided in the form of a hexagonal socket 68 extending axially within bolt head 56.

Bushing assembly 30 further includes a fault-closing means in the form of a fault-closing device 70 which, in this instance, is constructed similar to the fault-closing device described in co-pending patent application Ser. No. 937,737, entitled ELECTRICAL CONNECTOR, filed August 29, 1978, and assigned to the assignee hereof. Thus, fault-closing device 70 includes a chamber 72 for receiving arc-quenching gases generated by a tubular guide 74 of gas-evolving, arc-quenching material carried by a carrier 76 of insulating material which is secured to the female contact element 44, all forming a part of the female contact assembly 40. The female contact assembly 40 includes an annular piston 80 movable axially within the chamber 72 so as to permit axial movement upward from the lowermost position shown in FIG. 1, in response to the generation of arc-quenching gases resulting from a fault-closing condition, thereby facilitating completion of the connection between the female contact element 44 and an inserted complementary male contact element. The arc-quenching gases will pass through the central opening 46 in female contact element 44 and a central aperture 82 in piston 80 to enter the lower end of chamber 72 and bear against lower face 84 of the piston 80 to raise the piston, and the female contact element 44 coupled thereto, such that the female contact element 44 will advance to meet the incoming male contact element and more quickly accomplish mating of the complementary contact elements.

When the junction shown in FIG. 1 is in operation, cap 32 is fitted onto the bushing assembly 30. Cap 32 is in the form of a composite member molded of elastomeric materials. A portion 90 of an insulating elastomer includes a cavity 92 for receiving the upwardly-projecting body portion 94 of member 36 of bushing assembly 30. An outer portion 96 of conductive elastomer surrounds the portion 90 and provides an external shield, while an inner portion 98 of a conductive elastomer carries a central conductive probe 100 which contacts the female contact element 44 to provide an internal shield arrangement.

When it is desired to make a ground connection to the conductor 18 of cable 16, without disturbing the connection between the receptacle 10 and the terminal 12, cap 32 is removed, thereby exposing the bushing assembly 30, as seen in FIG. 1. An elbow receptacle (not shown) of the type having a configuration complementary to the upwardly-projecting body portion 94 of receptacle 10, and attached to a ground circuit, is then merely connected to the bushing assembly 30. Under ordinary procedures, the circuit through terminal 12 and cable 16 would be de-energized prior to connection of the grounded elbow receptacle with the bushing assembly 30, and the circuit would be tested at the bushing assembly 30 to determine that the circuit is de-energized. However, in some instances, due to equipment failure or operator error, the circuit actually may be energized. In such instances, the fault-closing device 70 will operate to enable safe completion of the ground connection.

Figure 3:
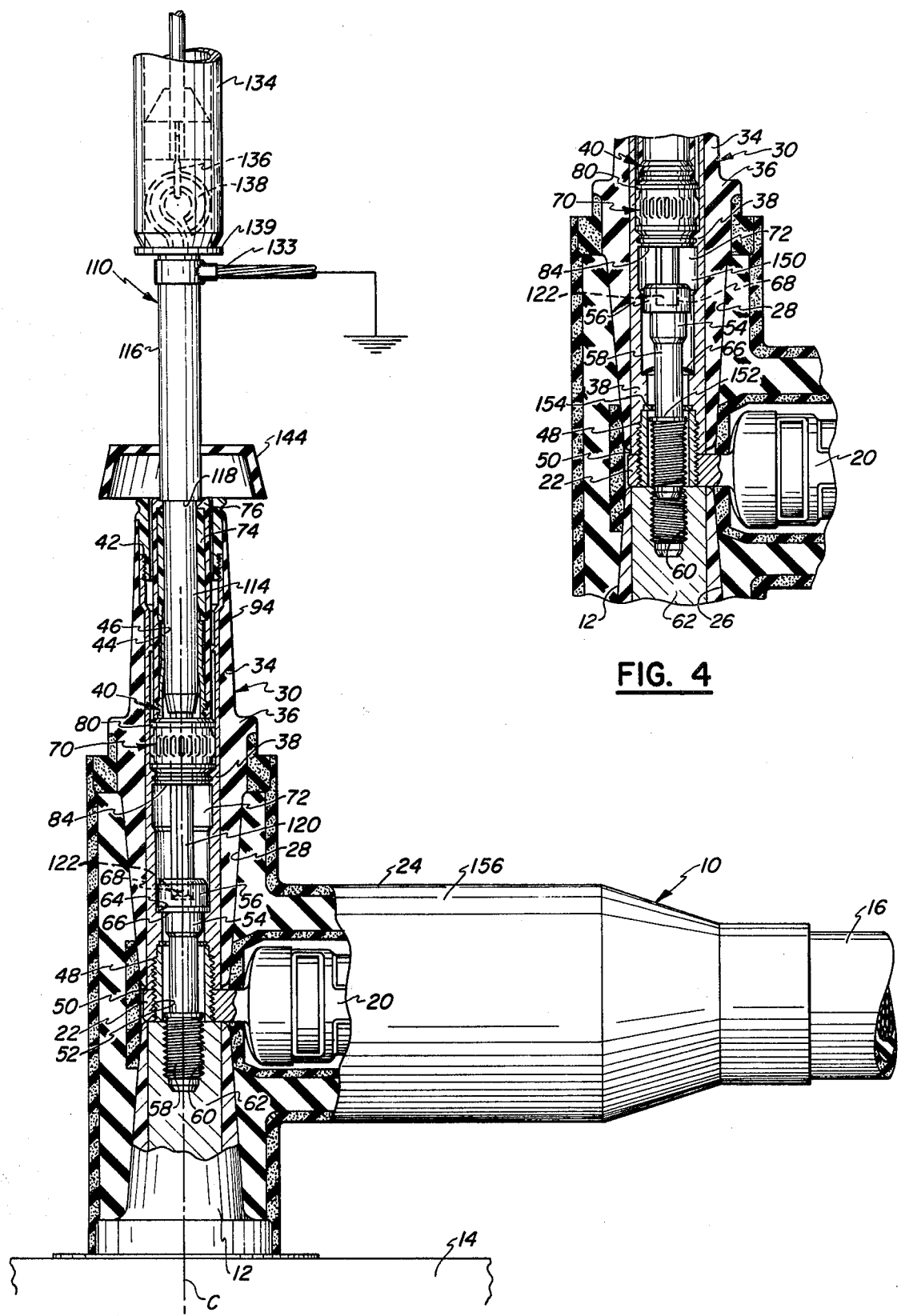
FIG. 3 is an elevational view similar to FIG. 1, but with the tool inserted in the connector.

Should it be desired to disconnect the receptacle 10 from the terminal 12, cap 32 is removed from bushing assembly 30, and a tool 110, as illustrated in FIG. 2, is inserted into the bushing assembly, as shown in FIG. 3. Tool 110 includes a sleeve 112 of conductive material, such as copper or aluminum, having a first portion 114 with an outer diameter complementary to the opening 46 in the female contact element 44. A second portion 116 of sleeve 112 has a slightly larger outside diameter so as to establish a shoulder 118 intermediate the ends of the sleeve 112. A rod 120 extends axially through the sleeve and has opposite ends 122 and 124. Rod 120 is movable both rotationally and axially relative to sleeve 112. In the position shown in FIG. 2, rod 120 is retracted so that the end 122 of the rod does not project beyond the corresponding end 126 of the sleeve 112. Rod 120 is retained in the retracted position by interengaging means shown in the form of a threaded collar 128 affixed to the rod 120 and threaded into a complementary threaded ring 130 affixed within the sleeve 112 at the other end 132 of the sleeve. A ground connection is made to sleeve 112 at 133.

Tool 110 is inserted into bushing assembly 30 after first attaching the tool to a hot-stick 134 (see FIG. 3). The hook 136 of hot-stick 134 is coupled with coupling means, shown in the form of a loop 138 and a flange 139 at the upper end 124 of rod 120, and the lower end 126 of sleeve 112 is inserted into tubular guide 74 and is advanced toward opening 46 of female contact element 44, the insertion being facilitated by a taper 140 at end 126. Sleeve 112 is advanced until shoulder 118 abuts the carrier 76, as seen in FIG. 3, so that portion 114 of the sleeve 112 serves as a male contact element mated with female contact element 44. Since sleeve 112 is grounded through the connection at 133, the female contact element 44 and the terminal conductor 62 will also be grounded. Should the circuit at the junction between the receptacle 10 and the terminal 12 be energized when tool 110 is inserted, the fault-closing device 70 will operate to permit safe completion of the insertion. A safety shield 144 is provided on sleeve 112 to deflect any gases or other matter which may be expelled upwardly out of the bushing assembly 30 in the event of a fault closing condition.

Once the tool 110 is seated within the bushing assembly 30, rod 120 is released from the retracted position within sleeve 112 by rotation of the rod until threaded collar 128 is released from threaded ring 130. Rod 120 is then advanced axially downwardly. The opening 46 in female contact element 44 is aligned with the central aperture 82 in the piston 80 along a central axis C so that the opening 46 and the aperture 82 establish an open passage 148 through the female contact element 44 and the portion of the fault-closing device 70 which lies between the female contact element 44 and the bolt 54, the open passage 148 providing access to the bolt head 56, and the socket 68 therein, from the exterior of the bushing assembly 30.

The lower end 122 of rod 120 is provided with a further wrenching configuration complementary to the wrenching configuration of socket 68 in the bolt head 56. In this instance, rod 120 is itself formed of hexagonal stock and end 122 has a hexagonal configuration complementary to the hexagonal shape of socket 68. Thus, advancement of rod 120 downwardly through passage 148 will enable insertion of the rod end 122 into the socket 68, which also is aligned along axis C, as seen in FIG. 3.

Figure 4:
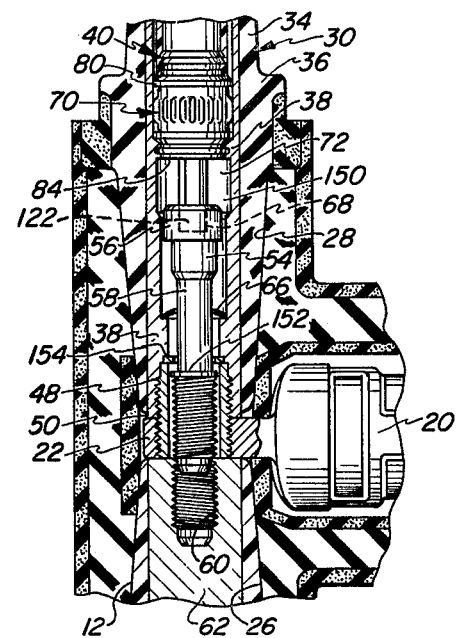
FIG. 4 is a fragmentary view of a portion of FIG. 3, but with component parts in another position.

Rod 120 is then rotated about axis C to release bolt 54 from the terminal conductor 62, as seen in FIG. 4. Rotation of the hot-stick 134 will accomplish the necessary rotation of bolt 54. Bolt 54 will be raised and sufficient clearance is provided at 150 to enable retraction and disconnection of the bolt 54 from the threaded hole 60 in the terminal conductor 62. However, in order to retain the bolt 54 in proper position for re-attachment, a stop shoulder 152 on threaded shaft 58 will abut a stop ring 154 on tubular member 38 to limit upward movement of the bolt.

Figure 5:
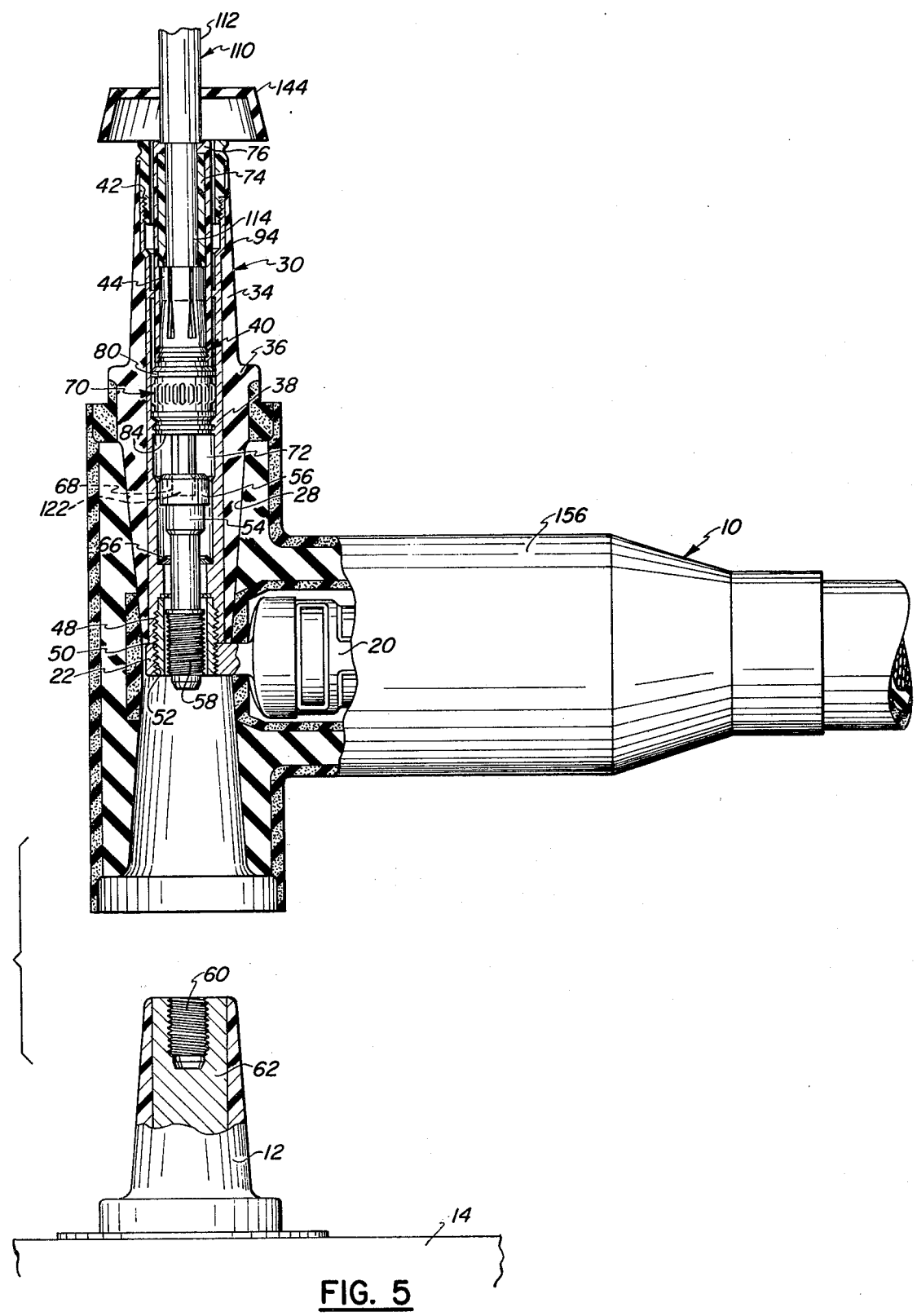
FIG. 5 is an elevational view similar to FIG. 1, but with the electrical connector disconnected from the terminal.

After bolt 54 is released from threaded hole 60 in the terminal conductor 62, the body 24 of receptacle 10 may be grasped along portion 156 by a further hot-stick tool (not shown) and pulled from the terminal 12, as shown in FIG. 5. The receptacle 10 will remain grounded through the ground connection at 133. In order to re-connect receptacle 10 to terminal 12, the above-described procedure merely is reversed.

It is noted that at all times the ground connection to the receptacle 10 is visible to the operator, in accordance with present safety requirements. Ground connections are made safely and with ease under energized conditions, as well as under de-energized conditions. The apparatus provided by the present invention is readily employed in connection with currently available hot-stick devices and is compatible with presently available components.

It is to be understood that the above detailed description of a preferred embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. Apparatus for enabling operation of a high voltage electrical connector from a remote location by the use of an insulated tool, such as a hot-stick, to effect selective grounding, and selective connection and disconnection of the connector and a terminal of an electrical apparatus, the connector having a terminal contact affixed to the conductor of a high voltage cable for electrically connecting the conductor to the terminal, said apparatus comprising:

a generally tubular housing extending axially between opposite ends;

means for joining the housing to the terminal contact;

a female contact element carried by the housing adjacent one of the opposite ends thereof and including an axial opening therein for receiving a complementary male contact element;

a threaded fastener carried by the housing adjacent the other of the opposite ends for securing the terminal contact to the terminal of the electrical apparatus, the threaded fastener having a wrenching configuration aligned with the axial opening in the female contact element;

a fault-closing means carried by the housing for enabling the closing of a ground connection to the female contact element under a fault-closing condition, the fault-closing means having an aperture passing axially therethrough and aligned with the opening in the female contact element and with the wrenching configuration of the threaded fastener to establish an open passage to the wrenching configuration through the female contact element and the fault-closing means; and a tool including a sleeve of conductive material receivable within the opening of the female contact element for making an electrical connection therewith;

a rod extending axially through the sleeve and having opposite ends, the rod being movable rotationally and axially relative to the sleeve;

a further wrenching configuration on the rod at one of the opposite ends, the further wrenching configuration being complementary to the wrenching configuration of the threaded fastener for engagement therewith; and a coupling means on the rod at the other of the opposite ends for selectively coupling the rod to the insulated tool, whereby axial movement of the rod will pass the rod axially through the open passage and engage the complementary wrenching configurations, and rotation of the rod will selectively engage and disengage the threaded fastener and the terminal of the electrical apparatus.

2. The invention of claim 1 including means for grounding the sleeve of conductive material.

3. The invention of claim 2 wherein:
at least a portion of the fault-closing means is located axially between the female contact element and the threaded fastener; and
the rod is axially movable through the aperture in the fault-closing means to reach the threaded fastener.

4. The invention of claim 3 wherein the fault-closing means includes:
a chamber in the housing; and
an annular piston movable axially within the chamber in response to the generation of arc-quenching gas resulting from a fault-closing condition upon insertion of the complementary male contact element into the female contact element.

5. The invention of claim 4 wherein the threaded fastener extends axially from the chamber through the terminal contact so as to extend beyond the terminal contact for engaging the terminal of the electrical apparatus.

6. The invention of claim 5 wherein the rod is movable axially within the sleeve between a retracted position, wherein said one of the opposite ends of the rod is located within the sleeve, and an extended position, wherein said one of the opposite ends of the rod is located beyond the sleeve for engagement with the threaded fastener, the rod and the sleeve including interengaging means for selectively securing the rod in the sleeve at the retracted position.

7. The invention of claim 6 wherein the wrenching configuration of the threaded fastener includes an axially extending socket in the threaded fastener and the further wrenching configuration on the rod is complementary to the axially extending socket for reception therein.

8. In an apparatus for enabling operation of a high voltage electrical connector from a remote location by the use of an insulated tool, such as a hot-stick, to effect grounding and selective connection and disconnection of the connector and a terminal of an electrical apparatus, the connector having a terminal contact affixed to the conductor of a high voltage cable for electrically connecting the conductor to the terminal, the improvement comprising:
a generally tubular housing extending axially between opposite ends;
means for joining the housing to the terminal contact;
a female contact element carried by the housing adjacent one of the opposite ends thereof and including an axial opening therein for receiving a complementary male contact element;
a threaded fastener carried by the housing adjacent the other of the opposite ends for securing the terminal contact to the terminal of the electrical apparatus, the threaded fastener having a wrenching configuration aligned with the axial opening in the female contact element;
a fault-closing means carried by the housing for enabling the closing of a ground connection to the female contact element under a fault-closing condition, the fault-closing means having an aperture passing axially therethrough and aligned with the opening in the female contact element and with the wrenching configuration of the threaded fastener to establish an open passage to the wrenching configuration through the female contact element and the fault-closing means, whereby access to the wrenching configuration of the threaded fastener is available through the open passage.

9. The invention of claim 8 wherein at least a portion of the fault-closing means is located axially between the female contact element and the threaded fastener.

10. The invention of claim 9 wherein the fault-closing means includes:
a chamber in the housing; and
an annular piston movable axially within the chamber in response to the generation of arc-quenching gas resulting from a fault-closing condition upon insertion of the complementary male contact element into the female contact element.

11. The invention of claim 10 wherein the threaded fastener extends axially from the chamber through the terminal contact so as to extend beyond the terminal contact for engaging the terminal of the electrical apparatus.

12. The invention of claim 11 wherein the wrenching configuration of the threaded fastener includes an axially extending socket in the threaded fastener.

13. A tool for use in an apparatus for enabling operation of a high voltage electrical connector from a remote location by the use of an insulated tool, such as a hot-stick, to effect grounding and selective connection and disconnection of the connector and a terminal of an electrical apparatus, the connector having a terminal contact affixed to the conductor of a high voltage cable for electrically connecting the conductor to the terminal, a generally tubular housing extending axially between opposite ends, means for joining the housing to the terminal contact, a female contact element carried by the housing adjacent one of the opposite ends thereof and including an axial opening therein for receiving a complementary male contact element, a threaded fastener carried by the housing adjacent the other of the opposite ends for securing the terminal contact to the terminal of the electrical apparatus, the threaded fastener having a wrenching configuration aligned with the axial opening in the female contact element, and a fault-closing means carried by the housing for enabling the closing of a ground connection to the female contact element under a fault-closing condition, the fault-closing means having an aperture passing axially therethrough and aligned with the opening in the female contact element and with the wrenching configuration of the threaded fastener to establish an open passage to the wrenching configuration through the female contact element and the fault-closing means, said tool comprising:
a sleeve of conductive material receivable within the opening of the female contact element for making an electrical connection therewith;
a rod extending axially through the sleeve and having opposite ends, the rod being movable rotationally and axially relative to the sleeve;
a further wrenching configuration on the rod at one of the opposite ends, the further wrenching configuration being complementary to the wrenching configuration of the threaded fastener for engagement therewith; and
coupling means on the rod at the other of the opposite ends for selectively coupling the rod to the insulated tool, whereby axial movement of the rod will pass the rod axially through the open passage and engage the complementary wrenching configurations, and rotation of the rod will selectively engage and disengage the threaded fastener and the terminal of the electrical apparatus.

14. The invention of claim 13 including means for grounding the sleeve of conductive material.

15. The invention of claim 14 including a shoulder on the sleeve of conductive material for limiting the extent of insertion of the sleeve into the opening in the female contact element.

16. The invention of claim 14 wherein the rod is movable axially within the sleeve between a retracted position, wherein said one of the opposite ends of the rod is located within the sleeve, and an extended position, wherein said one of the opposite ends of the rod is located beyond the sleeve for engagement with the threaded fastener, the rod and the sleeve including interengaging means for selectively securing the rod in the sleeve at the retracted position.

17. The invention of claim 16 wherein the wrenching configuration of the threaded fastener includes an axially extending socket in the threaded fastener and the further wrenching configuration on the rod is complementary to the axially extending socket for reception therein.

* * * * *